(12) United States Patent
Horvitz et al.

(10) Patent No.: US 9,086,292 B2
(45) Date of Patent: Jul. 21, 2015

(54) ROUTING, ALERTING, AND TRANSPORTATION GUIDANCE BASED ON PREFERENCES AND LEARNED OR INFERRED RISKS AND DESIRABILITIES

(75) Inventors: Eric Horvitz, Kirkland, WA (US); John Krumm, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1122 days.

(21) Appl. No.: 12/493,131

(22) Filed: Jun. 26, 2009

(65) Prior Publication Data
US 2010/0332131 A1 Dec. 30, 2010

(51) Int. Cl.
G01C 21/34 (2006.01)
G01C 21/00 (2006.01)
G01C 21/36 (2006.01)

(52) U.S. Cl.
CPC ........ G01C 21/3484 (2013.01); G01C 21/3697 (2013.01)

(58) Field of Classification Search
USPC ............... 701/25, 35, 414–417, 410, 425, 701/300–301, 411; 455/456.1; 340/995.19, 340/5.1, 905; 702/188; 705/4
See application file for complete search history.

(56) References Cited

U.S. PATENT DOCUMENTS

| | | | |
|---|---|---|---|
| 5,910,763 A | 6/1999 | Flanagan | |
| 6,112,074 A | 8/2000 | Pinder | |
| 6,816,878 B1 | 11/2004 | Zimmers et al. | |
| 6,914,525 B2 | 7/2005 | Rao et al. | |
| 7,239,860 B2 | 7/2007 | Stoks | |
| 7,343,306 B1 | 3/2008 | Bates et al. | |
| 7,962,282 B2 * | 6/2011 | Fujita et al. | 701/446 |
| 8,045,976 B2 * | 10/2011 | Kiddie et al. | 455/428 |
| 8,140,358 B1 * | 3/2012 | Ling et al. | 705/4 |
| 8,614,633 B1 * | 12/2013 | Lear et al. | 340/984 |
| 2002/0186144 A1 * | 12/2002 | Meunier | 340/825.28 |
| 2003/0225687 A1 * | 12/2003 | Lawrence | 705/38 |
| 2007/0229290 A1 | 10/2007 | Kahn et al. | |

(Continued)

OTHER PUBLICATIONS

Nodes on Ropes: A Comprehensive Data and Control Flow for Steering Ensemble Simulations; Waser, J.; Ribicic, H.; Fuchs, R.; Hirsch, C.; Schindler, B.; Bloschl, G.; Groller, M.E.; Visualization and Computer Graphics, IEEE Transactions on; vol. 17 , Issue: 12; Digital Object Identifier: 10.1109/TVCG.2011.225; Publication Year: 2011 , p. 1.*

(Continued)

*Primary Examiner* — Cuong H Nguyen
(74) *Attorney, Agent, or Firm* — Dan Choi; Judy Yee; Micky Minhas (57) ABSTRACT

Techniques and systems are disclosed that provide a risk-based assessment for a user based on user location information. Incident data is acquired for incidents that involve potential risks (e.g., to people and/or property) from a plurality of locations and contexts, considering such factors as date, time, weather, traffic, and velocity. The incident data is matched to the user's location and context directly or indirectly to provide one or more potential outcomes of interest (e.g., accidents, injuries, fatalities), and inferences regarding the likelihood of events are made available. These measures are compared to desired risk thresholds for the user. In one embodiment, routes, times, and conditions of travel may be preferred over others routes, times, and conditions. In another embodiment, users may be notified of a condition or a vehicle's maximum velocity may be reduced when the matched incident data meets/exceeds a user's risk threshold.

20 Claims, 5 Drawing Sheets

(56) References Cited

U.S. PATENT DOCUMENTS

| | | | |
|---|---|---|---|
| 2008/0004804 A1* | 1/2008 | Fujita et al. | 701/210 |
| 2008/0133300 A1* | 6/2008 | Jalinous | 705/7 |
| 2008/0195301 A1* | 8/2008 | Fabre et al. | 701/120 |
| 2009/0024273 A1* | 1/2009 | Follmer et al. | 701/35 |
| 2009/0284378 A1* | 11/2009 | Ferren et al. | 340/573.1 |
| 2010/0063851 A1* | 3/2010 | Andrist et al. | 705/4 |
| 2010/0228419 A1* | 9/2010 | Lee et al. | 701/25 |

OTHER PUBLICATIONS

Comparative Performance Analysis of CAC Reward Optimization Algorithms in Wireless Networks; Yilmaz, O.; Ing-Ray Chen; Advanced Information Networking and Applications, 2009. AINA '09. International Conference on; Digital Object Identifier: 10.1109/AINA.2009.26; Publication Year: 2009, pp. 463-470.*

A new approach in multi-objective portfolio optimization using Value-at-Risk based risk measure; Fulga, C.; Dedu, S.; Information and Financial Engineering (ICIFE), 2010 2nd IEEE International Conference on; Digital Object Identifier: 10.1109/ICIFE.2010.5609467; Publication Year: 2010, pp. 765-769.*

Parity space methods for autonomous fault detection and exclusion using GPS carrier phase; Pervan, B.S.; Lawrence, D.G.; Cohen, C.E.; Parkinson, B.W.; Position Location and Navigation Symposium, 1996., IEEE 1996; Digital Object Identifier:10.1109/PLANS.1996.509141; Publication Year: 1996, pp. 649-656.*

Parity space methods for autonomous fault detection and exclusion using GPS carrier phase; Pervan, B.S.; Lawrence, D.G.; Cohen, C.E.; Parkinson, B.W.; Position Location and Navigation Symposium, 1996., IEEE 1996; Digital Object Identifier: 10.1109/PLANS.1996.509141; Publication Year: 1996, pp. 649-656.*

Developing a Collaborative Map Creation Support System by Multimodal Information-gathering; Terashima, T. ; Sekizuka, H. ; Sasaki, T.;Information and Automation for Sustainability, 2008. ICIAFS 2008. 4th International Conference on; Digital Object Identifier: 10.1109/ICIAFS.2008.4783943; Publication Year: 2008, pp. 179-183.*

Spatial and Spatio-temporal Data Mining; Bogorny, V. ; Shashi Shekhar; Data Mining (ICDM), 2010 IEEE 10th International Conference on; Digital Object Identifier: 10.1109/ICDM.2010.166; Publication Year: 2010, p. 1217.*

Probe car based traffic information system experiment in shenyang; Wenjia Wang ; Mizuta, H.; ITS Telecommunications, 2008. ITST 2008. 8th International Conference on; DOI: 10.1109/ITST.2008.4740281; Publication Year: 2008, pp. 334-336.*

APT: Accurate outdoor pedestrian tracking with smartphones; Xiaojun Zhu ; Qun Li ; Guihai Chen; INFOCOM, 2013 Proceedings IEEE; DOI: 10.1109/INFCOM.2013.6567057; Publication Year: 2013, pp. 2508-2516.*

Padati: A Robust Pedestrian Dead Reckoning System on Smartphones; Pai, D. ; Malpani, M. ; Sasi, I. ; Aggarwal, N. ; Mantripragada, P.S.; Trust, Security and Privacy in Computing and Communications (TrustCom), 2012 IEEE 11th International Conference on ; DOI: 10.1109/TrustCom.2012.218; Publication Year: 2012, pp. 2000-2007.*

Map Matching Algorithm Based on Mobile Phone Location; Wang, J. ; Wang, D.H. ; Chen, S.; Intelligent Computation Technology and Automation (ICICTA), 2011 International Conference on; vol. 1; DOI: 10.1109/ICICTA.2011.176 Publication Year: 2011, pp. 676-679.*

SeqSLAM: Visual route-based navigation for sunny summer days and stormy winter nights; Milford, M.J. ; Wyeth, G.F. Robotics and Automation (ICRA), 2012 IEEE International Conference on; DOI: 10.1109/ICRA.2012.6224623 Publication Year: 2012, pp. 1643-1649.*

Achieving Guaranteed Anonymity in GPS Traces via Uncertainty-Aware Path Cloaking; Hoh, B. ; Gruteser, M. ; Hui Xiong ; Alrabady, A.; Mobile Computing, IEEE Transactions on; vol. 9, Issue: 8; DOI: 10.1109/TMC.2010.62; Publication Year: 2010, pp. 1089-1107.*

ACO based spatial data mining for traffic risk analysis; Ravikumar, K. ; Gnanabaskaran, A.; Innovative Computing Technologies (ICICT), 2010 International Conference on; DOI: 10.1109/ICIN-NOVCT.2010.5440092; Publication Year: 2010, pp. 1-6.*

Why is so Little Attention Paid to the Centralization of Data?; Corbett, A. ; Bin Young; Aerospace Conference, 2008 IEEE DOI: 10.1109/AERO.2008.4526591; Publication Year: 2008, pp. 1-9.*

Letchner et al., "Trip Router with Individualized Preferences (TRIP):Incorporating Personalization into Route Planning", 2006, American Association for Artificial Intelligence (www.aaai.org), http://www.cs.washington.edu/homes/letchner/Papers/letchner_iaai06.pdf.

Krumm et al., "Predestination: Inferring Destinations from Partial Trajectories", UbiComp 2006: The Eighth International Conference on Ubiquitous Computing, Sep. 17-21, Orange County, CA, USA, http://research.microsoft.com/en-us/um/people/horvitz/predestination.pdf.

Clark, Emily, "AwareSpot Location Based Alert System for Mobile Phones", pp. 1-4, Jul. 2, 2008, http://www.gizmag.com/awarespot-location-based-alert-system-for-mobile-phones/9572/.

"Using Location to Improve Pricing and Risk Assessment Processes within the UK Property Insurance Industry", Sep. 2007, http://www.mapflow.com/whitepaper/Mapflow_WhitePaper_v5.pdf.

* cited by examiner

ROUTING, ALERTING, AND TRANSPORTATION GUIDANCE BASED ON PREFERENCES AND LEARNED OR INFERRED RISKS AND DESIRABILITIES

BACKGROUND

Computer-based route planning tools typically allow a user to identify a starting point and an ending point for a desired trip, and then the route planner can identify a route of travel based on a variety of factors. Users often rely on route planners for a variety of trips, such as finding a way to a local business, or to a friend's house, to planning cross-country trips. The variety of planners available provide a plurality of user-based preferences for trip planning, such as fastest time, shortest-distance, avoiding highways, and more. Users commonly utilize computer-based routing devices, such as GPS-based travel planners mounted in a car or smart phone on a person, in unfamiliar locations; allowing the device to provide preferred routes of travel to get to desired locations.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While travel planners and GPS-based route identifiers can allow for some user preferences, for example, about routes and about peoples' interest in awareness and advisories relevant to routes and transportation over specific routes, the models are based on a few, often static assumptions. For example, directions systems may assume that traveling through a city at midnight may be the same as at 5:30 PM. In this example, while the distances may be the same regardless of the time of day, an amount of traffic, accidents, and other factors may provide for varying travel time and other attributes that have relevance to drivers' or passengers' travel preferences.

Further, when a user is traveling or located in a particular area, they may not realize that some areas comprise a higher level of risk than others. For example, particular stretches of roads or areas of a city may have higher incident of traffic-related accidents, injuries or fatalities. Additionally, crime-rates may be higher at certain locations and during various times of the day, under varying circumstances. People traveling in familiar or unfamiliar areas may wish to be able to review or be alerted in stream about the statistics associated with these incidents and decide whether they want to be at the identified locations, for example, based on their level of risk tolerance. As an example, users could apply current travel conditions (e.g., speed, weather, road conditions) to incidents for their current travel location to determine a potential risk factor.

Current techniques and systems do not provide a user with an ability to utilize incident information in association with their personal tolerance levels to plan for their locations, or be alerted when in a location that exceeds their desired risk threshold or for a desired attribute, or a threshold on a desired property that has relevance to an action. Accordingly, one or more techniques and/or systems are disclosed herein that can allow a user to be alerted/notified when they are or plan to be in a location that may not meet a preferred risk level. For example, where a user may prefer a route of safer travel versus a shorter travel time, information can be provided that allows the user to decide their location based on incident data that involves potential risks and the user's desired risk level.

In one embodiment for providing a risk-based assessment for a user based on their location, incident data is acquired that has information on incidents for a plurality of locations, such as incidents involving risk (e.g., to people or property) and/or other incidents of interest to the user. The incident data can be matched to the user's location, for example, by searching a database of the incidents to find those that match the user's current, potential or planned locations. Information associated with the one or more matched incidents can be compared to a desired risk threshold for the user, such as a risk tolerance level measured in risk unit measures for one or more incident attributes (e.g., accident fatalities). If the threshold is met, the user can be notified/alerted of a condition, for example, through a mapping tool utilizing a user interface or some personal alert.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that can allow a user to be alerted/notified when they are or plan to be in a location that may not meet a preferred risk level (e.g., a level of tolerance for particular risks, such as accident rates on a road segment).

Figure 1:
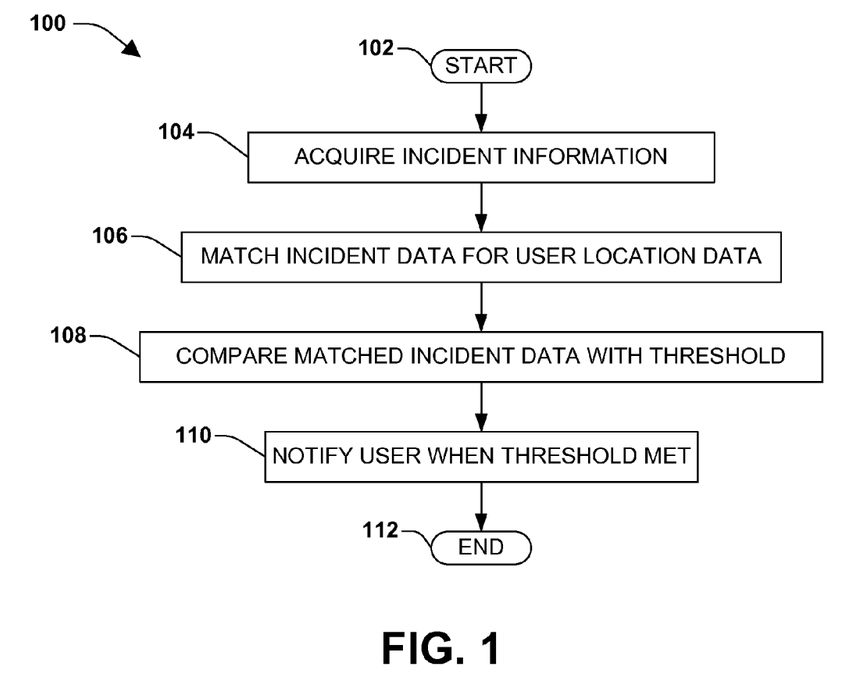
FIG. 1 is a flow-chart diagram of an exemplary method for providing a risk-based assessment for a user based on the user's location.

For example, where a user may prefer a route of safer travel (e.g., over a road segment that has fewer traffic-related accidents, or through a neighborhood that has a lower crime rate) over a reduced time of travel, the method can provide information that allows the user decide their location (e.g., current, planned or other potential locations) based on incident data and the user's desired risk metric(s). FIG. 1 is a flow-chart diagram of an exemplary method 100 for providing a risk-based assessment for a user based on their location.

The exemplary method 100 begins at 102 and involves acquiring incident data, including information about incidents that involve potential risk (e.g., to people or property) for a plurality of locations. For example, Federal, State and many local authorities and agencies maintain databases that comprise information on a variety of incidents that may involve risk to people or property. For example, a bureau of motor vehicles agency, local sheriff, or police department may maintain a database of vehicle accidents and/or crime-related statistics. Information stored for respective accidents can include: a location, time, day for the accident; along with any injuries or fatalities; suspected or known criminal activity (e.g., drunk driving, felony fleeing, etc.); circumstances associated with the accident (e.g., excess speed, unsafe road conditions); results of any investigations; reports filed by responders; and other documentation.

Other examples of risk-related incident information can include, but are not limited to: reports of crimes and/or criminal activity; environmental incidents; special reports on particular incidents in particular locations (e.g., an agency or private industry group report on crime rates in areas, housing vacancies, foreclosures, industry types); and news reports. In one embodiment, the incident type and information type for an incident can be tailored for a desired purpose (e.g., where merely vehicle accident data may be used for vehicle routing information). Other examples of incident resources may include websites, news outlets, freedom of information act requests, and demographic and statistical analysis services.

At 106, in the exemplary method 100, incident data is matched to data for a user's location. For example, incident data can include a location for the incident, such a police report identifying where the incident took place. In one embodiment, the user's location (e.g., a current location identified by a GPS unit, or planned locations from a mapping application) can be matched to the location of one or more incidents from the retrieved incident data. The matched incident data for the user's location can be compared with a user risk threshold, at 108. For example, the acquired data for a matched incident may comprise plurality of additional information, other than the location, which can be compared to the user's risk threshold for that type of incident, and/or for a particular attribute of the incident (e.g., accident-type, injuries, fatalities, type of crime, etc.).

In one embodiment, the user's risk threshold can be a level of risk that a user may be willing to accept for a given situation. As an example, a user may be traveling in an entertainment district of a city where information for particular incidents is available. In this example, crime-related incidents may be lower in this district during the daytime and increase at night. Therefore, a user's risk tolerance level may not be met during the day, in this area, but the threshold may be met/exceeded at night.

In one embodiment, risk levels may be measured using risk unit measures or risk-based metrics, which can identify a likelihood of a risk-related event occurring. In this embodiment, risk unit measures may include one or more attributes or measures and functions of sets of attributes or measures that capture a likelihood of events of interest. In this embodiment, a risk metric can be determined for a location (e.g., from the plurality of locations) based on one or more sets of incident data associated with the location, using the risk unit measures for one or more of the incident attributes (e.g., fatalities). Further, the user's desired risk threshold can be determined using the risk unit measures for one or more or the incident attributes. For example, the user can set a desired accident rate as a threshold, which can be compared against accident rates for the one or more user locations.

In one embodiment, drivers or passengers, or other principal agents of a routing decision (e.g., parents of teenage drivers using a routing system), can specify thresholds, for example, on a microaccident rate (e.g., a measure in terms of units of one in a million chance of an accident) or a microinjury rate (e.g., a measure of one in a million chance of an injury) or a micromorts (e.g., a measure of one in a million chance of death). As a further example, a parent may specify that a child may not travel on a certain road in specific conditions that exceeds eight micromorts, or that the car does not travel so fast as to exceed that level of micromorts. In one embodiment, such information may be used to alert a driver when entering a region where a threshold may be exceeded with some probability so as to alert the driver to slow down. Alternatively, a car may automatically be limited in its speed so as to maintain the preferred thresholds.

At 110, in the exemplary method 100, the user is provided with a notification of a condition if the matched incident data meets the user's desired risk threshold. In one embodiment, where a user has selected particular threshold levels for one or more incident criteria (e.g., accident rates, crime rates, etc.), they can be alerted when one or more of the criteria are met for their location. For example, a user may be planning a trip using some mapping application that allows them to enter risk threshold criteria for incidents, such as dangerous road conditions, crime areas, travel-related environmental conditions, and more. In this example, the user can be alerted by the application when their planned route takes them into an area where the user's threshold has been met. A mapping application may also allow the user to select a preferred travel route based on the user's risk tolerance, for example, selecting a route that provides a desired level of alerts (e.g., none) over a route that may get them there faster. Further, in one embodiment, the user may be able to adjust or input a variety of risk tolerance levels, and the mapping system can identify various routes based on the users risk threshold.

Further, in another embodiment, risk-based metrics may be stated in terms of rates or fluxes of events per distance and/or time, as event densities and fluxes. For example, a driver may wish to be alerted about a preferred (e.g., maximum) speed that allows her to keep a micromort per mile or micromort density beneath a particular threshold or preferred density. In one embodiment, the risk-based metrics can be mapped to a system that provides traveler tracking and alerting, such as a car's navigation system (e.g., a combination GPS and mapping unit often found in automobiles).

Figure 2:
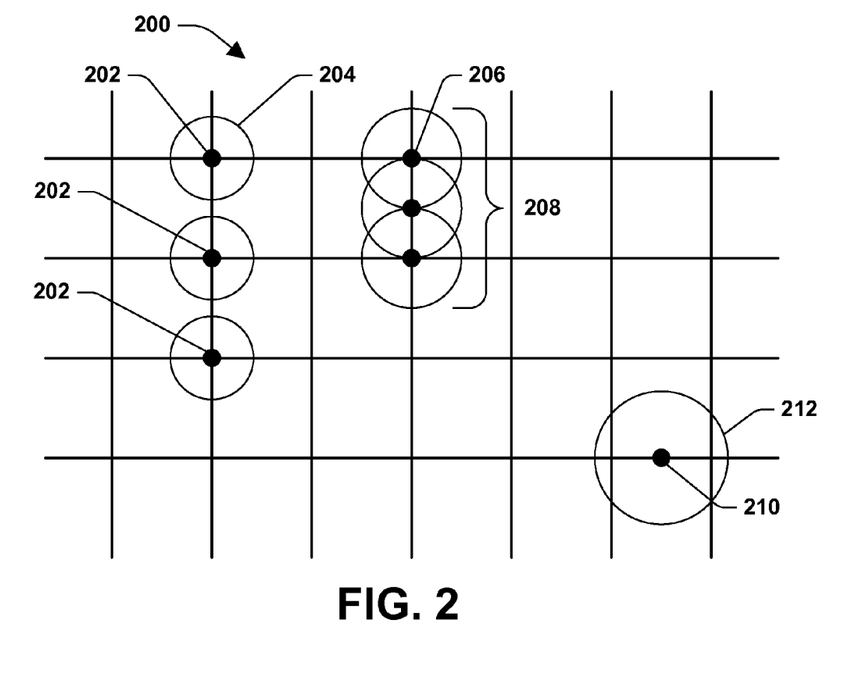
FIG. 2 illustrates an exemplary embodiment where one or more techniques and/or systems, described herein, may be implemented.

As an example, FIG. 2 illustrates an exemplary grid 200 that can represent a system of streets in a city. In this example, incident locations 202, 206, and 210 are marked where data for one or more incidents of various types, which involve potential risk to people or property, have been collected. Further, in one embodiment, users may select distance criteria for their desired risk thresholds, for example, by selecting a boundary area with the incident location at a center of the boundary. In this example, when the user's location falls within an incident location boundary, such as depicted by 204, 208, and 212 in the example 200, the user can be alerted if a threshold condition is met.

In FIG. 2, the incidents 202 can comprise traffic accidents, which have occurred at intersecting streets in the city. For traffic accidents the user may select a small boundary 204 that includes merely those areas that may be incidental to the accidents. Further, the incidents 206 may be in an entertainment district, and can comprise fights, assaults, and incidents of pick-pocketing or petty theft. These incidents 206 may have larger boundaries 208 than the traffic accidents, depending on the user's preferences. Additionally, incident 210 may comprise an armed robbery, for example, for which the user may select an even larger incident boundary for alerts.

As an example, if a user was planning to drive through the exemplary grid 200 of the city they may wish to avoid those areas having high accident incidents 202 (e.g., high microaccident rates), and a may use a digital mapping device (e.g., mapping application, or car mounted GPS unit) to plan an appropriate route to avoid these areas, such as by inputting a desired microaccident rate as a threshold. Further, the user may wish to avoid the armed robbery incident area 210, such by inputting a desired microfelony rate (e.g., a measure in terms of units of one in a million chance of a felony occurring), depending on their risk threshold, and can plan their trip accordingly.

Additionally, the user may be a pedestrian walking the streets and/or planning to visit the entertainment district, for example. In this example, the user may wish to avoid the entertainment district at certain times of the day (e.g., late at night) based on the incident's location 206, and the type of incidents involving risk compared with their risk threshold. In one embodiment, the user may have a hand-held device, such as a mobile phone, PDA, or some other portable computing device, that can provide a warning when the user enters the area, and/or is in the location at a particular time, based on the user's risk tolerance level.

Figure 3:
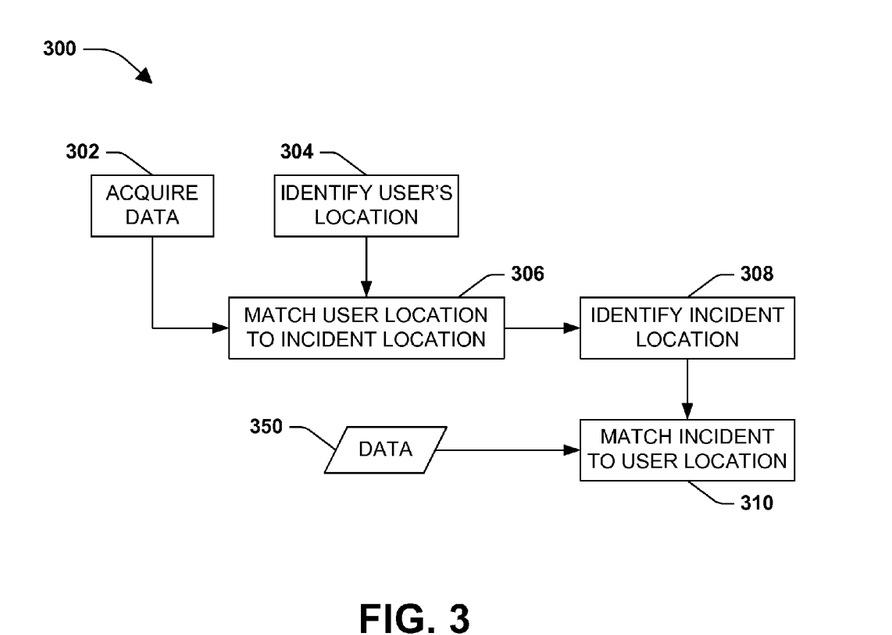
FIG. 3 is a flow diagram illustrating one embodiment of a portion of a method where incident data can be identified for a user's location.

FIG. 3 is a flow diagram illustrating one embodiment 300 of a portion of a method where incident data can be identified for a user's location. At 302, incident data is acquired, as described above, such as by collecting information from a variety of databases. The user's location is identified at 304, which can comprise identifying a user's current location, for example, by using a GPS device and/or using user input using a user interface (UI) from a computing device (e.g., a computer, PDA, GPS, mobile smart phone, etc.).

Further, the user's location can be identified from a planned route of travel, such as where the user may input an intended destination to a mapping application or GPS enabled application (e.g., vehicle-based routing device). As an example, a user can input a start and end point to a mapping application, and the application may produce a planned travel route for the user, based on particular criteria (e.g., travel-time, distance, etc.). In this example, the planned travel route comprises a plurality of user locations, as the user may move along the route.

Additionally, a user's location can be identified from their potential route of travel. For example, a computing device may be able to identify one or more likely routes of travel for a user based on the user's current location and direction of travel, historical travel, likely destination, typical routing for other users, and other factors. In this example, the device may be able to predict that the user is likely to proceed through one or more of a plurality of user locations based on calculations.

At 306, the user's location can be used to find one or more matching incident locations from the acquired data, and the one or more incident locations can be identified, at 308. For example, the acquired incident data can comprise a plurality of locations for the incidents, where more than one incident may be associated with a same location, such as traffic accidents. In one embodiment, the user's location can be matched against a database that comprises the locations of the incidents, and one or more incidents can be identified for the user's location.

At 310, incident data 350 associated with the one or more incidents can be matched to the identified location. As described above, the incident data can comprise one or more of a plurality of information about the incident (other than its location), which may used for comparison to the user's risk threshold (e.g., comparing a micromort rate to the user's desired micromort threshold). In one embodiment, a desired area surrounding the user's location may be used, where incidents that have locations within the desired area can be identified and the accompanying data 350 matched for that location.

Figure 4:
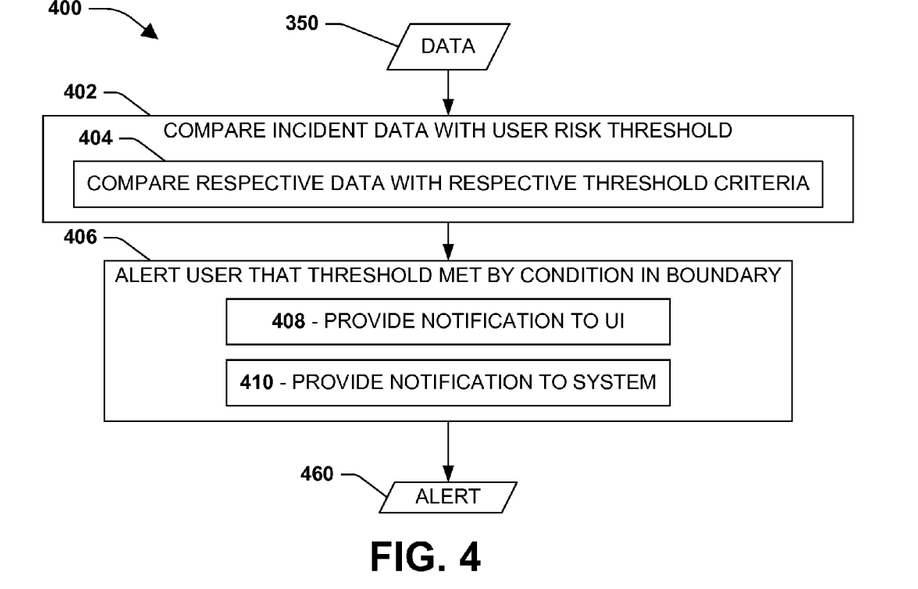
FIG. 4 is a flow diagram illustrating one embodiment of a portion of a method where incident data is compared with a user's risk threshold for the purpose of alerting the user.

FIG. 4 is a flow diagram illustrating one embodiment 400 of a portion of a method where incident data is compared with a user's risk threshold for the purpose of notifying/alerting the user. The incident data 350 that is associated with the user's location can be compared with the user's risk threshold, at 402. At 404, comparing the matched incident data 350 with the risk threshold can comprise comparing respective incident data against one or more threshold criteria for the user's location. For example, as in FIG. 2, the user may have a different risk threshold for assault than they do for petty-theft, as in 206. In this example, where merely one incident of assault may trigger the threshold, it may take three petty-theft incidents to trigger the threshold. In this embodiment, the various data associated with the incidents, such as time of day, injuries, conditions, crimes, etc. can be compared with the one or more thresholds for these data.

For example, on a day when rain begins to fall in the context of a dry spell, roads may be more slippery during the initial wetting of the road, depending on configuration of the road, number of cars on the road, the velocities that are typical for a stretch of road, and the road materials and designs at that stretch of road, as well as such environmental considerations as the temperature. In this example, there may be explicit data about accidents that have occurred in similar situations (e.g., or across all situations) or for that specific stretch of road, indexed by time of day, day of week, and month of year, and such data may be coupled with information about the monitored or expected speed of travel associated with each case.

At 406, the user can be alerted of a condition within a desired incident boundary if the incident data meets the user's desired risk threshold. In one embodiment, alerting the user can comprise providing notification to a UI, at 408, on a computing device that a condition for the user's location meets the desired risk threshold, as described above. For example, the UI may provide an alert that notifies the user of a condition, and/or may use a route planning system that alerts the user that a location in a planned route has incidents that meet the user's risk threshold.

In one embodiment, at 410, alerting the user can comprise providing notification to a system that alerts the user that a condition for the user's location meets the desired risk threshold. Further, the alert 460 may be provided to a system that performs an automated function related to a condition for the user's location meeting the desired risk threshold. For example, a device, such as a mobile smart phone, may utilize the alert 460 to notify the user of the condition. The system may also perform some automated response, such as rerouting the user when a condition arises.

In this embodiment, a probability that one or more of a set of concerning events (e.g., of slipping, of a single or multiple car accident, of an accident of a particular degree, and of injuries or deaths, etc.) occurs can be monitored and relayed to the user as a display or alert, for example, when thresholds on risk exceed desired (e.g., preset) values. In another embodiment, a car-based warning system can inform a driver when risk exceeds some threshold value, for example, at the current velocity and let the driver know what speed to reduce travel to in order to attain a more acceptable risk. Such a system may enhance the safety of a driver by providing context-sensitive additional road warnings, akin to having digital versions of the yellow special recommended speed signs posted in the United States road system. Alternatively, such information can inform a cautious driver who has slowed for conditions (e.g., rain while traveling on a twisting road) that he or she can speed up (e.g., to the speed limit) as the road may be safer than the driver suspects.

Risks may be accessed as static information in tables or computed dynamically, or from combinations of sources. Contextual signals can be included, such as time of day and temperature. For example, a case library of accidents and accident-related injuries on a particular stretch of road (or derived from data from similar roads), coupled with data on the speed that cars were travelling at the time of an accident, as well as the time of day, weather conditions, and traffic conditions, could be used to compute and monitor current risks. Continuing the example, there may be a situation for a driver driving at 50 kilometers per hour on a curving road during the rain where no alerts or slowing actions are recommended upon entering a tight curve, given that speed when the temperature is 5 degrees Celsius. However, driving at the same speed, in the same weather conditions on the same portion of curving road, may be associated with the generation (coming in advance of the start of the curve) of a "Slow-down to forty kilometers per hour" alert when the sensed temperature is 1 degree Celsius as the micromort density surpasses the driver's threshold on risk at that speed when the road reaches a phase transition to ice and begins to lose traction. Such inferences can come from raw data as well as from physical models of friction, acceleration, kinematics, and properties of water on concrete or asphalt.

In one embodiment, alerting the user of a condition when the matched incident data meets the user's desired risk threshold can comprise providing a different level of alert to the user, for example, based on a number of threshold criteria met by one or more incident data. For example, when a one threshold criterion is met by a condition the alert 460 may be a level one (e.g., low sound, yellow light, etc.). In this example, as more threshold criteria are met, the alert level can be increased. Further, in this embodiment, a different level of alert can be provided to the user based on a type of threshold criteria met by one or more incident data. For example, where a traffic accident may provide a first type of alert, an armed robbery and/or rape may provide a second, higher alert.

In one aspect, the incidents can be mapped to a computer-based mapping system, such as a travel planner, digital map, GPS, etc. In one embodiment, as described above, the information associated with the incidents can be used for planning user travel. In one embodiment, the mapped data can be used for determining a location risk metric for location based on one or more sets of incident data associated with the location.

For example, as in FIG. 2, the locations 206 have overlapping boundaries 208. In this example, a location risk metric may be assigned to the general area of 208 comprising the three incidents of assault/petty-theft, thereby creating a lower location risk metric for this area. In this example, the location risk metric can be expressed in risk unit measures that identify rates of particular attributes of incidents, such a likelihood of being a victim of a particular crime (e.g., microtheft rate). As another example, location risk metrics can be developed for a plurality of locations on a digital map, and the user may plan a travel route that comprises merely those locations having a desired location risk metric. In one example, the user may utilize a mapping program to plan routes of travel based on desired risk metrics, whereby a computer can plan one or more routes of travel for the user to select from.

In one embodiment, the techniques and systems described herein may be utilized by military personal in battle zones. For example, live battlefield data can be collected and incident metrics can be assigned to different battlefield scenarios based on a risk factor for the respective incidents (e.g., enemy soldier activity, artillery, tanks, snipers, etc.). In this embodiment, soldiers traveling across an area can plan a route of travel (e.g., using a computer program) in a battle zone based on the risk factors for the incidents and the desired risk metric for the soldiers. For example, a soldier may want to get to a particular location and a sliding scale can be applied that allows the soldier to choose safety over travel time/distance, where it may be safer to travel a particular route but that route can increase a time and/or distance of travel. Further, the data can be updated in real-time as battle field situations change.

In another aspect, risk factors and alerting may be leveraged beyond selection of routes to be rendered during transportation in a context-dependent manner. For example, statistics of prior accidents for portions of a route and/or data from similar routes based on data collected over multiple routes that share one or more properties, and/or physics models of road safety may be harnessed to provide awareness, alerting, and guidance to users as they drive a vehicle.

In this aspect, incident data from a first location may be inferred to a second location based on matching criteria between the first and second locations. In one embodiment, locations that have similar (e.g., within a desired parameter) conditions, such as traffic patterns, road conditions, environmental conditions, may be likely to have similar types and amounts of incidents. However, incident data my merely be available for one or the two locations. In this embodiment, data collected for the first location may be inferred to the second location, for example, in order to provide comparison to the user's risk metric for areas without incident data.

In one embodiment, a predictive model can be built and used to provide a user with notifications based on risk-based information for their current, potential or planned routes of travel, for example. In this embodiment, building the predictive model can comprise training a predictive model with risk-based incident information for a plurality of locations, such as accident information for road or travel segments. A trained predictive model can be used to provide the user with notifications (e.g., a risk factor based on accidents, injuries or deaths) for the user's location (e.g., current location or planned/potential locations). Data about the user's situation scenario, such as velocity, weather conditions, road conditions, can be input to the predictive model. This may comprise the user's current situation, and/or planned or potential situations (e.g., planning a trip through the mountains in January).

Further, in this embodiment, the risk-based data from incidents from one or more locations can be matched with the risk-based data from the user's situation scenario. Incident data may be inferred from a first location to a second location (e.g., user's location), based on some matching criteria, such as similar road conditions, similar travel segments, similar environmental conditions, velocity, etc. In this way, for example, the incident data used by the predictive model to provide the user with notifications for their location may come from a plurality of locations, for example, not merely the user's location, thereby providing a larger sample size for predictions. Additionally, while the predictive model can provide the user with a risk-based notification, such as a risk metric, for their current or planned situation, it may also provide alternate risk-based notifications for alternate scenarios for the user.

Figure 5:
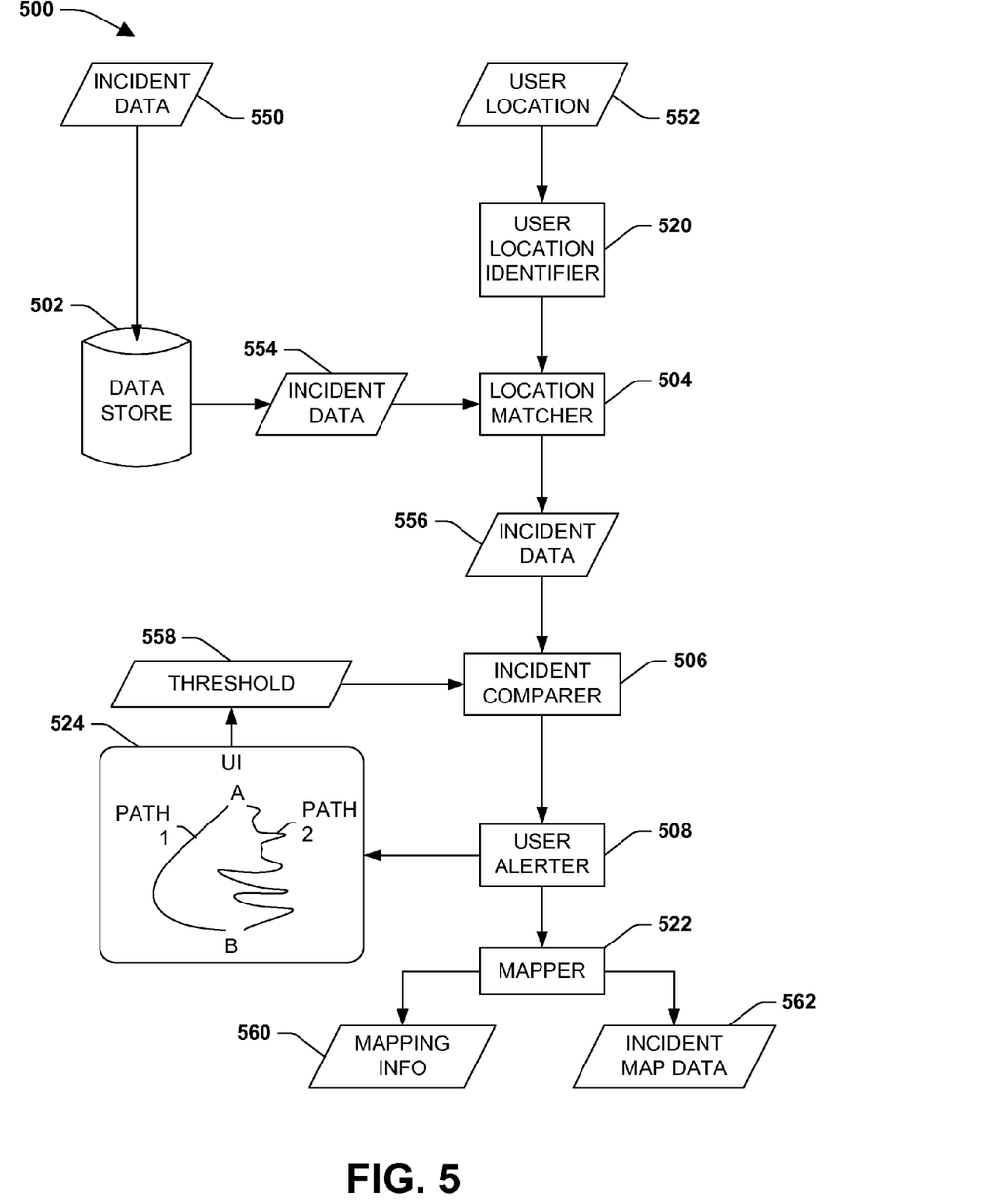
FIG. 5 is a component-block diagram of an exemplary system for providing a risk-based assessment for a user based on their location.

A system can be devised that can allow a user to be alerted/notified when they are or plan to be in a location that may not meet a preferred risk level. As an example, some users may prefer a safer route rather than a fastest route; the system can provide information that allows the user decide their location based on incident data and the user's desired risk metric(s). FIG. 5 is a component-block diagram of an exemplary system 500 for providing a risk-based assessment for a user based on their location.

An incident data storage component 502 stores data about incidents that involve potential risk 550 (e.g., to people and/or property) for a plurality of locations, such as for a particular locality or for a larger area, such as a county, state or the United States. Incidents can comprise any items of interest to a user, which may be available from a plurality of databases and other information resources that may provide some risk-related information, such as accidents or crimes. For example, a Department of Transportation may compile list of vehicle accidents for their state, which further comprise details about the respective incidents.

An incident location matching component 504 is operably coupled to the incident data storage component 502. The incident location matching component 504 matches incident data 554 to data for a user's location 552. In one embodiment, the incident location matching component 504 can comprise a user location identifier 520 that identifies the user's location 552, such as by using GPS data and/or input from a user. In this embodiment, the incident location matching component 504 can identify an incident location (or a plurality of incidents for a location) based on the user's location 552 from the user location identifier 520.

An incident data comparison component 506 is operably coupled to the incident location matching component 504. The incident data comparison component 506 compares the matched incident data 556, identified by the location matching component 504, with a desired risk threshold 558 for the user. In one embodiment, the user can input a risk metric (e.g., measured in risk unit measurements, such as microaccidents), for example, using a user interface 524 (UI). The one or more thresholds 558 can be compared against the incident data 556 (e.g., compared to risk unit measurements for one or more attributes for the incidents) to determine if the threshold(s) 558 have been met (or exceeded).

A user notification component 508 provides notification to the user of a condition (e.g., by providing an alert) when the matched incident data 556 meets the user's desired risk threshold 558. In one embodiment, the user notification component 508 can be operably coupled to a UI 524 on a computing device, to provide notification to the user that the condition for the user's location has met their desired risk threshold 558. For example, if a user is planning trip from point A to point B, path 1 may provide a faster travel time and a shorter overall distance, but take them though locations that exceed the user's risk thresholds (e.g., risk tolerance level for traffic accidents, or crime). In this example, the UI 524 can provide an alternate path 2, which may take longer (e.g., be a rural route), but provides a safer route of travel in accordance with the user's risk metric. Similarly, if the road conditions along path 2 are treacherous (e.g., considering weather and road conditions), path 1 may be more desirable as it may still exceed one or more of the user's risk thresholds (e.g., for some types of accidents), but by a smaller margin than that of path 2.

In this scenario, of course, the user could be provided with yet another alternative route (path 3) that does not exceed the user's risk threshold. Alternatively, for example, while traveling on path 2, the system may provide an alert to the user that conditions have exceeded their risk threshold (e.g., based on road and weather conditions), allowing the user to slow down to bring the risk level to within their threshold.

In another embodiment, the system can comprise a mapping component 522, which can be configured to map the plurality of incident locations 560 to a computer-based mapping system. For example, the plurality of incidents can be provided as mapping points 560 to a digital mapping application. Further, the mapping component 522 can be configured to provide incident data 562 in a user interface for an incident mapped to a computer-based mapping system. For example, where the incidents can be mapped to a digital mapping system, the incident data (e.g., type of incident and surrounding circumstances) can be made available when a user selects the incident location. Additionally, in one embodiment, the incident data 562 mapped to the computer-based mapping system can comprise risk metrics for the respective locations. For example, accident rates, mortality rates, injury rates, and crime rates could be mapped to particular locations or road segments. In this example, the risk metrics can be compared against a user's risk threshold for those types of incident attributes.

In one aspect, systems may be coupled with visualization tools. In one embodiment, these visualization tools may allow users to assess risk in terms of an expected number of events that can happen per year, for example, by applying different thresholds for speed alerting or speed control, for example, into a system. As an example, a driver may be alerted to expect to have a serious accident once per year under current thresholds, and that by changing a threshold that lowers a micromort flux, for example, and following the systems recommendations, he or she may merely expect a serious accident once every ten years. In one embodiment, alerting based on desired thresholds can be coupled with speed controls and/or monitoring to modulate insurance rates of individuals, for example.

Further, in this aspect, visualizations and analyses tools can also provide decision analyses and information on cost-benefit tradeoffs of different routes. In one embodiment, users can be allowed to specify and view output of rich, multiattribute models that capture risk along with other costs and benefits in a multiattribute utility function. For example, drivers, passengers, or other principal agents of trips can be provided with a means of seeing a total time of a trip and a total risk of a trip and be able to work in an interactive manner with a system, considering a spectrum of opportunities, including such variants as, viewing a suboptimal route that would become optimal if a speed is reduced to sixty-percent of the speed limit should it start to rain for several sections of the route.

In another aspect, measures of risk may be employed in systems that enable users to understand and specify risk and risk thresholds for road segments, for entire trips, and for safety over time, spanning multiple trips or large portions of time, for example. In one embodiment, such measures and thresholds may be used to delete certain segments or routes from consideration in a road planning system. For example a driver may assert that he or she would not drive on a route with more risk than a specified threshold. Alternatively, a long-term travel planner may be instructed to manage an annual or lifetime probability of an accident or injury to a specific threshold and consider this preference as it generates plans across multiple trips over time. In another embodiment, a driver or passenger may wish to be alerted in real time, or at some appropriate advance time to encountering one or more road (other travel) segments on a trip, that a threshold on risk is being exceeded. As an example, such alerting can allow for actions to be taken, including re-routing and/or slowing down a vehicle until the risk came under a preferred threshold.

In one aspect, alerting may also be weighed and gated by considerations of situations that can be more dangerous or may require more attention or specific actions (e.g., slowing, etc.) than a driver expects. That is, an alerting device may be less useful in situations that are obvious to users, and can be more useful in situations that may cloak dangers. For example, drivers may naturally slow to navigate a twisting road in a downpour, but may feel safe when driving quickly on a highway as the temperature reaches thirty-two degrees, and they become at risk for a major accident as they lose traction. In one embodiment, a system can consider such expectations and surprises in the alerting model and alert people when the information may be most valuable. Analysis and generative predictive models can be used to separately identify scenarios, captured by routes and locations and contexts, where people do not expect to need to slow down or be especially cautious and maintain awareness, yet where they do. For example, there may be situations where blind roadways enter major roads just at the end of a tightly looping turn. As another example, in some locations, there may be places where cars may come barreling out of driveways in reverse, cloaked in bushes and trees until they enter a larger street, and where drivers would not typically expect residential driveways, because of the surrounding commercial area and the large, fast moving artery. Models of expectation and surprise can be used within a warning system to surpress advisory alerts or stimulate the generation of such alerts, respectively.

Figure 6:
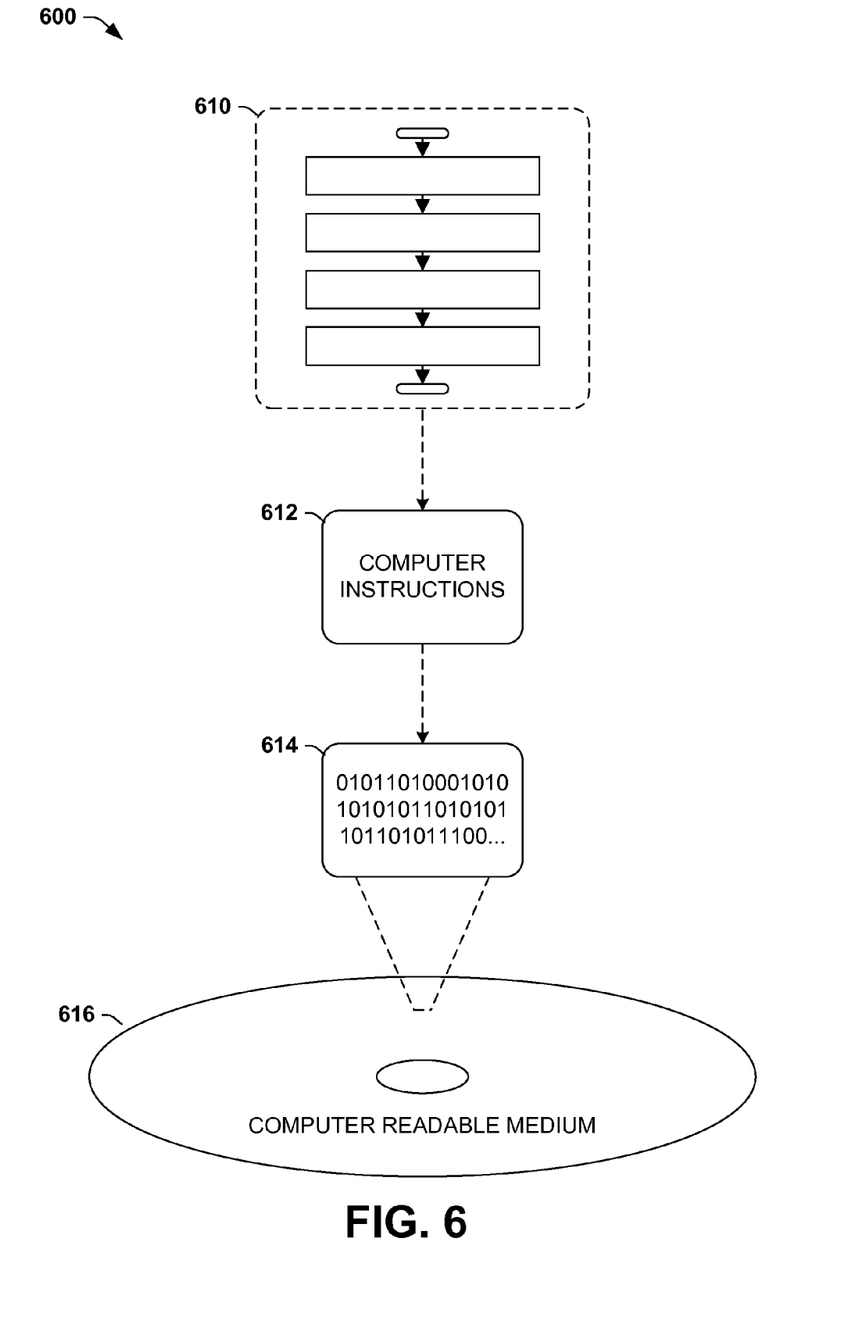
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as the exemplary method 100 of FIG. 1, for example. In another such embodiment, the processor-executable instructions 604 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
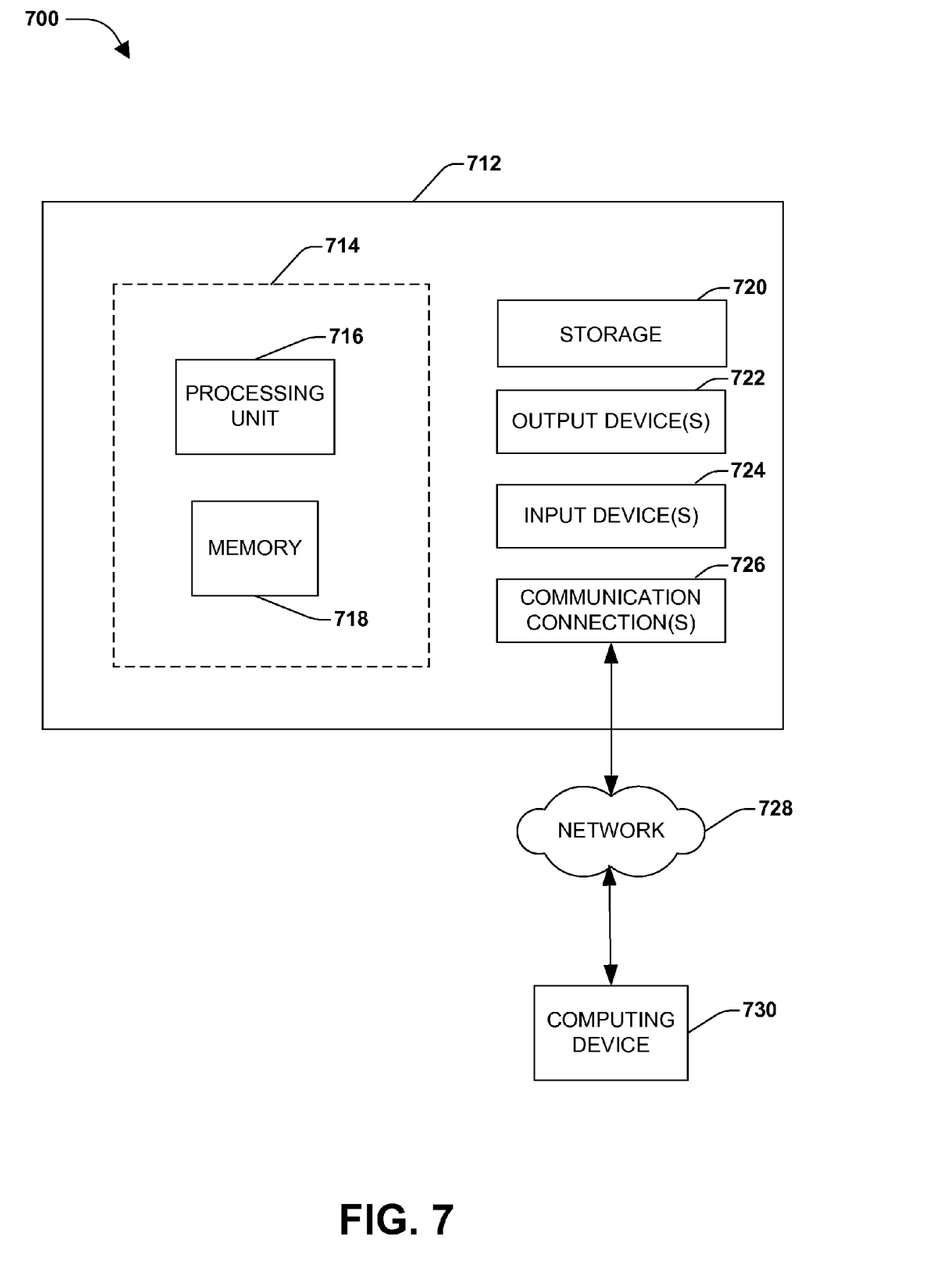
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   acquiring, automatically on a hand-held device comprising a processing unit, first incident data comprising first information about a first incident associated with first risk, the first information based upon first activity that occurred at a first location;
   acquiring, automatically on the hand-held device, second incident data comprising second information about a second incident associated with second risk, the second information based upon second activity that occurred at a second location;
   providing, automatically on the hand-held device, at least one of:
   a first indication at a first mapped location in a user interface comprising a map, the first indication provided at the first mapped location based upon the first incident data and corresponding to the first incident occurring at the first location; or a second indication at a second mapped location in the user interface comprising the map, the second indication provided at the second mapped location based upon the second incident data and corresponding to the second incident occurring at the second location;

matching, automatically on the hand-held device, at least one of the first location or the second location to a location associated with a user of the hand-held device using at least one of the first incident data or the second incident data, the matching performed while a vehicle is driven in association with the user; and providing, automatically on the hand-held device based upon the matching, at least one of a first notification in association with the first indication at the first mapped location in the user interface when the first risk meets a first risk threshold associated with the user or a second notification in association with the second indication at the second mapped location in the user interface when the second risk meets a second risk threshold associated with the user using at least one of the first incident data or the second incident data, the providing at least one of a first notification or a second notification performed while the vehicle is driven in association with the user.

2. The method of claim 1, at least one of the first information or the second information based upon one or more of:
one or more environmental conditions associated with an incident;
at least one of a time, a day or a date when the incident occurred;
one or more circumstances associated with the incident; or
documentation related to the incident.

3. The method of claim 1, comprising:
identifying the location associated with the user.

4. The method of claim 3, the identifying the location associated with the user based upon one or more of:
a current location of the user;
a planned route of travel of the user; or
one or more potential routes of travel of the user.

5. The method of claim 1, comprising:
determining at least one of the first risk threshold or the second risk threshold.

6. The method of claim 1, comprising:
determining at least one of the first risk threshold or the second risk threshold based upon a user selection.

7. The method of claim 1, comprising using one or more risk unit measures to identify a likelihood of a risk-related event occurring, the one or more risk unit measures comprising one or more of:
a measure of one or more risk attributes; or
a function of one or more risk attributes.

8. The method of claim 1, comprising:
identifying the location associated with the user via GPS.

9. The method of claim 1, the hand-held device comprising a smart phone.

10. The method of claim 1, at least one of the first notification or the second notification provided to a system and configured to at least one of:
indicate that a route of a desired level of risk has been planned; or
provide a risk factor metric to the user based on a selected location.

11. The method of claim 1, comprising:
building a predictive model for determining one or more risk-based notifications.

12. The method of claim 1, the providing at least one of a first notification or a second notification comprising providing an audio alert.

13. The method of claim 1, comprising:
determining a location risk metric for the location based on one or more sets of incident data associated with the location.

14. The method of claim 1, the providing at least one of a first notification or a second notification comprising providing a visual alert.

15. The method of claim 1, comprising:
inferring incident data from a third location to a fourth location based on matching criteria between the third location and the fourth location.

16. A system, comprising:
one or more processing units; and
memory comprising instructions that when executed by at least one of the one or more processing units perform operations comprising:
acquiring, automatically on a hand-held device, first incident data comprising first information about a first incident associated with first risk, that occurred at a first location;
acquiring, automatically on the hand-held device, second incident data comprising second information about a second incident associated with second risk that occurred at a second location;
providing, automatically on the hand-held device, at least one of:
a first indication at a first mapped location in a user interface comprising a map, the first indication provided at the first mapped location based upon the first incident data and corresponding to the first incident occurring at the first location; or
a second indication at a second mapped location in the user interface comprising the map, the second indication provided at the second mapped location based upon the second incident data and corresponding to the second incident occurring at the second location;
matching, automatically on the hand-held device, at least one of the first location or the second location to a location associated with a user of the hand-held device using at least one of the first incident data or the second incident data; and
providing, automatically on the hand-held device based upon the matching, at least one of a first notification in association with the first indication at the first mapped location in the user interface when the first risk meets a first risk threshold associated with the user or a second notification in association with the second indication at the second mapped location in the user interface when the second risk meets a second risk threshold associated with the user using at least one of the first incident data or the second incident data, at least one of the matching or the providing at least one of a first notification or a second notification performed while a vehicle is driven in association with the user.

17. The system of claim 16, the operations comprising building a predictive model for determining one or more risk-based notifications.

18. The system of claim 16, the providing at least one of a first notification or a second notification comprising providing at least one of an audio alert or a visual alert.

19. The system of claim 16, the hand-held device comprising a smart phone.

20. A computer readable storage device comprising instructions that when executed perform operations comprising:

acquiring, automatically on a hand-held device, first incident data comprising first information about a first incident associated with first risk, the first information based upon first activity that occurred at a first location;

acquiring, automatically on the hand-held device, second incident data comprising second information about a second incident associated with second risk, the second information based upon second activity that occurred at a second location;

providing, automatically on the hand-held device, at least one of:
- a first indication at a first mapped location in a user interface comprising a map, the first indication provided at the first mapped location based upon the first incident data and corresponding to the first incident occurring at the first location; or
- a second indication at a second mapped location in the user interface comprising the map, the second indication provided at the second mapped location based upon the second incident data and corresponding to the second incident occurring at the second location;

matching, automatically on the hand-held device, at least one of the first location or the second location to a location associated with a user using at least one of the first incident data or the second incident data; and providing, automatically on the hand-held device based upon the matching, at least one of a first notification in association with the first indication at the first mapped location in the user interface when the first risk meets a first risk threshold associated with the user or a second notification in association with the second indication at the second mapped location in the user interface when the second risk meets a second risk threshold associated with the user using at least one of the first incident data or the second incident data.

* * * * *